United States Patent [19]

Troussier et al.

[11] 4,039,497

[45] Aug. 2, 1977

[54] POLYTETRAFLUOROETHYLENE BASED COATING COMPOSITIONS

[75] Inventors: Maurice Troussier, Pierre-Benite; Huynh Van Lang, Lyon, both of France

[73] Assignee: Produits Chimiques Ugine Kuhlmann, Paris, France

[21] Appl. No.: 624,402

[22] Filed: Oct. 21, 1975

[30] Foreign Application Priority Data

Oct. 29, 1974   France ................................. 74.36075

[51] Int. Cl.$^2$ .............................................. C08L 27/18
[52] U.S. Cl. ........................ 260/29.6 F; 260/29.6 RB; 428/422; 428/463; 428/500
[58] Field of Search ................... 260/29.6 F, 29.6 RB, 260/900; 428/422

[56] References Cited

U.S. PATENT DOCUMENTS

| | | | |
|---|---|---|---|
| 3,019,206 | 1/1962 | Robb | 260/29.6 F |
| 3,830,770 | 8/1974 | Ribbans | 260/29.6 F |
| 3,962,169 | 6/1976 | Arruda et al. | 260/29.6 F |
| 3,967,018 | 6/1976 | Jansta et al. | 428/422 |

FOREIGN PATENT DOCUMENTS

| | | | |
|---|---|---|---|
| 1,108,942 | 4/1968 | United Kingdom | 260/29.6 F |

*Primary Examiner*—M. J. Welsh
*Attorney, Agent, or Firm*—Pennie & Edmonds

[57] ABSTRACT

The present invention relates to polytetrafluoroethylene based coating compositions containing polyvinylidene fluoride and lithia (lithium hydroxide). These compositions make it possible to make polytetrafluoroethylene coatings which adhere strongly to various types of substrata.

5 Claims, No Drawings

POLYTETRAFLUOROETHYLENE BASED COATING COMPOSITIONS

BACKGROUND OF THE INVENTION

I. Field of the Invention

The present invention relates to polytetrafluoroethylene based coating compositions containing polyvinylidene fluoride and lithia.

II. Description of the Prior Art

It is known that one can apply to metal or other surfaces polytetrafluoroethylene coatings so as to make use of the anti-adhesive properties of this polymer. These coatings are particularly interesting in the field of culinary utensils. However, as a result of the nature of polytetrafluoroethylene, the coatings normally achieved with this resin exhibit very poor adhesion to the substrata on to which they are applied.

It is known that the aforementioned adhesion may be improved by including in the coating compositions certain additives which are sometimes known as bonding agents. Although numerous compositions containing bonding agents have been proposed so as to bring about improved adhesive coatings of polytetrafluoroethylene, only two types of composition seem to be generally accepted. These are polytetrafluoroethylene compositions containing a mixture of chromic acid and phosphoric acid and polytetrafluoroethylene compositions containing lithium polysilicates.

The compositions containing a mixture of chromic acid and phosphoric acid are described in particular in U.S. Pat. No. 2,562,118. They are obtained from an aqueous dispersion of polytetrafluoroethylene, the above acid mixture, and possibly other additives such as emulsifiers and pigments. While these coating compositions exhibit good adhesive characteristics, particularly when applied upon steel and aluminum, they nevertheless possess two very serious drawbacks. The first is that these compositions, which are highly charged with mineral acids, are not very stable such that it is necessary to maintain the acid components separate from the rest of the composition, and to only admix it with the rest of the composition just prior to application. A second drawback of the chromic acid and phosphoric acid containing coating compositions is that these compositions contain toxic hexavalent chromium. Thus, in various countries, including France, their application as coatings upon culinary utensils is not permitted.

The aforementioned compositions containing lithium polysilicate are described in French Pat. No. 2,024,171. They consist essentially of an aqueous suspension of polytetrafluoroethylene and lithium polysilicate. While these compositions may be applied on to culinary utensils, the adhesion of these coatings depends to a large extent on the exact nature of the lithium polysilicate employed. Also, the lithium polysilicate has to be free from alkali metals other than lithium and must have a molar ratio of $SiO_2/Li_2O$ which must be regulated within very narrow limits and its preparation in an aqueous medium requires a ripening phase which is difficult to control. Finally, the adhesion of this type of coating is very much dependent on the nature of the dispersion of polytetrafluoroethylene used in its manufacture. Thus, it is apparent that coating compositions containing lithium polysilicate are both laborious to prepare and exhibit adhesive properties. which often are unsatisfactory.

Also, as regards the present state of art vis-a-vis polytetrafluoroethylene based coating compositions, it is useful to note that the compositions mentioned above, whether they are those containing a mixture of chromic acid and phosphoric acid or those containing lithium polysilicate, may be applied either alone or as primers which favour adhesion thereupon. In the latter case, which is by far the most frequent in practice, after treating the surface to be coated with one of the compositions described above, one applies a conventional polytetrafluoroethylene based finishing lacquer. By conventional polytetrafluoroethylene based finishing lacquer one means compositions containing polytetrafluoroethylene and various other additives, but not containing bonding agents. These lacquers, which when used alone yield satisfactory coatings relative to their appearance and surface properties, nevertheless exhibit very poor adhesion characteristics upon the substratum.

SUMMARY OF THE INVENTION

The present invention relates to polytetrafluoroethylene based coating compositions which contains:

a. polytetrafluoroethylene in the dispersed form;
b. polyvinylidene fluoride in the dispersed form;
c. lithia; and
d. an aqueous medium.

The polytetrafluoroethylene based coating composition of the instant invention is both easy to prepare and possesses superior adhesive characteristics. The composition of the instant invention may be applied to metal or other surfaces so as to take advantage of the anti-adhesive properties of the polymer and may advantageously be applied to culinary utensils.

DESCRIPTION OF THE PREFERRED EMBODIMENTS

The polytetrafluoroethylene based compositions of the instant invention may be either applied alone or, preferably, may be applied as a primer bonding coat upon which there is then applied a conventional polytetrafluoroethylene finishing lacquer used to achieve the finishing coat.

The polytetrafluoroethylene is advantageously dispersed in the form of spheroidal or elongated particles which do not exceed about 0.5 microns in their largest dimension. The polyvinylidene fluoride is advantageously dispersed in the form of spherical particles of a diameter which does not exceed about 0.5 microns.

While the proportion of the constituents of the composition to be used is not critical, it is preferable that the polytetrafluoroethylene and the polyvinylidene fluoride together represent from about 10 to 50 percent by weight of the total composition, and the polyvinylidene fluoride represents preferably from about 5 to 25 percent by weight of the total of the polytetrafluoroethylene and the polyvinylidene fluoride. The lithia preferably represents from about 0.2 to 2 percent by weight of the total of the polytetrafluoroethylene and the polyvinylidene fluoride.

The compositions of the instant invention may also contain conventional additives such as the well known emulsifier or emulsifiers necessary for stabilizing the dispersed particles of polytetrafluoroethylene and polyvinylidene fluoride as well as pigments, fillers and generally speaking the conventional additives currently employed in polytetrafluoroethylene based coating compositions. In fact, any additive may be incorporated in the basic composition as long as it does not interfere with the purpose and advantage of the instant invention, the same being easily determined by one skilled in the art.

The simplest process for preparing these compositions comprises:

1. mixing in suitable proportions an aqueous dispersion of polytetrafluoroethylene, an aqueous dispersion of polyvinylidene fluoride and an aqueous solution of lithia;
2. adding the emulsifiers and/or the other additives which may be desired; and
3. diluting with water until one obtains a concentration of polymers of the desired value.

Commercial dispersions of polytetrafluoroethylene which contain about 60% of polymer are well-suited for the preparation of the compositions according to the invention. These commercial dispersions are generally stabilized by 5 or 6%, based on polytetrafluoroethylene, of a non-ionic surface active agent such as the condensation product of ethylene oxide and an alkylphenol such nonylphenol. Furthermore, they contain a small quantity of ammonia which imparts an alkaline character to them. Other dispersions of polytetrafluoroethylene than those indicated above may also be used provided that their concentration is sufficient to permit the preparation of the desired composition.

As aqueous dispersions of polyvinylidene fluoride one may use dispersions such as those obtained directly by the emulsion polymerization of vinylidene fluoride. These dispersions generally have a polymer concentration of between about 20 and 50% and more usually between about 30 and 40%. The particle size of the dispersed particles is between about 0.1 and 0.5 microns. The stability of these dispersions is sufficient to permit their use within the framework of the invention without there being any necessity to add any stabilizers to them. Since dispersions obtained directly by polymerization of vinylidene fluoride are perfectly adapted for the preparation of the compositions of the invention, it is obvious that any stable aqueous dispersion of polyvinylidene fluoride would also be suitable, whatever may be the manner in which it has been obtained.

The compositions according to the instant invention may be applied on to any metallic or other hard base. Advantageously, they may be applied on ferrous metals, aluminium and alloys of aluminium and also on metals treated by a ceramic frit which covers their surface in a discontinuous or continuous manner. If the substrata on which the coating compositions are to be applied are naturally smooth they are preferably rendered rough by sanding or chemical attack. These substrata must be clean and free from any trace of grease.

The application of the compositions according to the invention may be carried out by any of the classic techniques such as dipping, brush application or spraying with a gun. This latter technique is particularly suitable.

The thickness of the coating normally applied is less than about 30 microns. By thickness of coating one means the thickness of the coating obtained after the application of the composition of the instant invention and drying at a temperature lower than or equal to about 120° C.

When the composition of the instant invention is applied alone as the finishing coat without the subsequent application of a polytetrafluoroethylene based finishing lacquer, the thickness of the coating is preferably adjusted to between about 10 and 30 microns.

When the composition of the instant invention is used, according to the preferred form of application of the invention, that is, only to provide a primer bonding coat, the thickness of this dried coat is advantageously between about 4 and 10 microns. Onn this dried primary coat one then applies a conventional polytetrafluoroethylene based finishing lacquer in the form of a coat of thickness, when measured after drying, which is advantageously between about 20 and 40 microns.

The coating obtained, whether it is formed by a single coat from the composition according to the instant invention or by a primary coat with a composition according to the invention and a final coat with a conventional polytetrafluoroethylene based finishing lacquer placed there over, is subjected to a thermal treatment intended to sinter the polytetrafluoroethylene. This thermal treatment is preferably carried out at a temperature equal to or greater than about 380° C. Its duration depends upon the temperature chosen. Thus at about 400° C a heating time of the order of 20 minutes is desirable, whereas at about 420° C a heating time of 5 minutes is sufficient. This sintering treatment of the final coating is always carried out on a dried coating, that is to say whose volatile components have already been eliminated at moderate temperature, preferably at a temperature lower than or equal to about 120° C. In the case of a composite coating prepared with a primary coat obtained with a composition according to the instant invention and a final coat obtained with a conventional finishing lacquer thereover, the primary coat may be sintered at a temperature equal to or greater than 380° C prior to the application of the final coat, but this intermediate thermal treatment at a high temperature is not compulsory and generally it is preferred to carry out a single operation of sintering on the combined primary and finished coating. On the other hand, the simple drying of the primary coat prior to the application of the final coat is compulsory in all cases.

Examples 1-3, 5,7,7-8, and 10-15, which are not restrictive, illustrate the present invention with comparative Examples 4, 6 and 9 likewise illustrating the advantages of the coating compositions of the instant invention.

In these examples two types of dispersions of polytetrafluoroethylene generally available and manufactured by the Produits Chimiques Ugine Kuhlmann and marketed under the registered trademarks SOREFLON 60 type III and SOREFLON 604 will be used. Their concentration of polytetrafluoroethylene is of the order of 60%. These dispersions are both stabilized with approximately 3% of TRITON X 100. The TRITON X 100 of ROHM & HAAS, which is also generally available, is a nonionic emulsifier obtained by the condensation of ethylene oxide and an alkylphenol. The two types of dispersion have an average distribution of size of dispersed particles of the same order, being between about 0.2 and 0.3 microns, but the particle size range is wider in the case of SOREFLON 604. Another difference between the two dispersions relates to the tensile strength of the polymers when isolated and molded under standard conditions. This tensile strength is distinctly lower in the case of SOREFLON 604, which is an indication of a lower molecular weight.

As regards the dispersions of polyvinylidene fluoride two types will be cited in the examples. In both cases they are 35% aqueous dispersions of dispersed polymer in the form of regular spherical particles of about 0.25 to 0.30 microns in diameter. Their difference is to be found in the fluidity in the molten state of the dispersed polymer, measured in an capillary thermometer, such as that described in ASTM Standard D 1238-57 T, the temperature being 250° C and the load being regulated to 10kg, the fluidity being measured in milligrames of matter extruded in 1 minute. The two types of dispersions cited in the examples are characterized by fluidities in the molten state of the dispersed polymer of 1000 and 10 respectively. These dispersions are only stabilized by traces of standard fluorinated emulsifiers - on the order of 0.1% based on the polymer - of which no account will be taken in the compositions cited in the examples.

EXAMPLE 1

A coating composition is prepared by the simple mixture of a dispersion of polytetrafluoroethylene SOREFLON 604, a dispersion of polyvinylidene fluoride of fluidity 1000, of a 10% aqueous solution of lithia, of TRITON X 100, of sodium laurylsulphate and water, such that there is obtained the following composition, expressed in parts by weight per 100 parts of mixture.

| | |
|---|---|
| polytetrafluoroethylene (ex SOREFLON 604) | 22.50% |
| polyvinylidene fluoride of fluidity 1000 | 2.50% |
| lithia | 0.25% |
| Triton X 100 | 3.00% |
| sodium laurylsulphate | 1.00% |
| water | 70.75% |

The lithia represents 1% by weight based on the total of polytetrafluoroethylene/polyvinylidene fluoride.

This composition is applied by means of spray gun on to an aluminum plate which has been previously degreased and depolished with abrasive paper No. 400. After drying for about 30 minutes at 80° C., the deposited coat has a thickness of 6-7 microns.

On to this primary coat there is applied, again by means of spray gun, a pollytetrafluorethylene based conventional finishing lacquer having the following composition:

| | |
|---|---|
| polytetrafluorethylene (ex SOREFLON 604) | 38% |
| Triton X 100 | 3% |
| sodium laurylsulphate | 1% |
| silicone resin | 4% |
| toluene | 10% |
| titanium dioxide | 3% |
| water | 41% |

After drying for about 30 minutes at 80° C. the coat of finishing lacquer has a thickness of between 25 and 30 microns.

The aluminum plate which has received both the primary coat and the coat of finishing lacquer as described above is then subjected to a thermal treatment for 5 minutes at 420° C.

After cooling, the coating is subjected to the following adhesion test.

A square pattern is made by scratching the coating down to the metal by means of a blade. In this way there is drawn a first series of equidistant parallel straight lines 1 mm apart. Then upon these lines a second series of perpendicular straight lines are drawn. In this way there are drawn squares having a side measuring 1 mm length. On to this square pattern there is applied an adhesive tape, Scotch type, which is removed by peeling from one end. If no part of the coating is torn off with the adhesive tape, the adhesion is deemed to be good.

This is the case of the coating as described in this Example.

EXAMPLE 2

The coating composition of the invention as described in Example 1 is applied in the same manner except that after the application and drying of the first coat, the aluminum plate which supports it is subjected to a thermal treatment of 5 minutes at 420° C. The coat of finishing lacquer is then applied, dried and heated as described in Example 1.

During the square test described in Example 1 the adhesion is shown to be good.

EXAMPLE 3

The coating composition of the instant invention as described in Example 1 is applied by means of a gun upon an aluminum plate previously degreased and depolished with abrasive paper No. 400. A coat of a thickness of the order of 15 microns is obtained after drying at 80° C. The coating thus formed, without the application of a finishing lacquer, is subjected to a thermal treatment for 5 minutes at 420° C. During the square test described in Example 1 the adhesion of the coating is shown to be good.

EXAMPLE 4

Only the coat of finishing lacquer as described in Example 1 is applied by gun upon an aluminium plate which has previously been degreased and depolished by means of abrasive paper No. 400. After drying at 80° C. this coat has a thickness of 25 to 30 microns and the plate thus coated is subjected to a thermal treatment for 5 minutes at 420° C.

During the square test described in Example 1, the adhesion of the coating was found to be very poor. Not only was the coating torn off in the squared zone, but the unsticking proceeded further than this. This comparative Example shows clearly the value of the compositions according to the invention for use in the preparation of adhesive coatings.

EXAMPLE 5

The steps of Example 1 are repeated except that the composition of the instant invention now only contains 0.125% of lithia based on this composition, namely 0.5% based on the total of polytetrafluoroethylene and polyvinylidene fluoride.

The adhesion of both coatings, the primary coat according to the composition of the instant invention and the finishing lacquer, is shown to be good when applying the square test.

EXAMPLE 6

The steps of Example 1 are repeated except that now the lithia is omitted.

The adhesion of the coating obtained with both the primary coat and finishing lacquer is very poor when the square test is applied.

This comparative Example shows the value of lithia in the compositions according to the instant invention.

EXAMPLE 7

The steps of Example 1 are repeated except that now 0.375% of lithia is used in the composition according to the instant invention, that is to say, 1.5% based on the total of polytetrafluoroethylene and polyvinylidene fluoride.

The adhesion of the complete coating, the primary according to the instant invention and finishing lacquer, is shown by means of the square test to be good.

EXAMPLE 8

The steps of Example 1 are repeated except that now 01625% of lithia is used in the composition according to the instant invention, namely 2.5% based on the total of polytetrafluorethylene and polyvinylidene fluoride.

The adhesion of the complete coating, the primary coat and finishing lacquer, is still good, but a little less so than that of the coating described in Example 1. During the square test, a few small squares of the coating were torn away by the adhesion tape without there being the complete unsticking of this coating.

That is why the preferred content of lithia in the compositions according to the instant invention is limited to 2% based on the total of polytetrafluoroethylene and polyvinylidene fluoride.

EXAMPLE 9

The steps of Example 1 are repeated except that now the polyvinylidene fluoride is omitted from the composition and as compensation for such omission the content of polytetrafluorethylene is raised to 25%.

The adhesion of the complete coating, the primary coat and finishing lacquer, is shown to be very poor when the square test is applied.

This comparative Example shows the value of the polyvinylidene fluoride in the compositions according to the instant invention.

EXAMPLE 10

The steps of Example 1 are repeated except that now dispersion of polyvinylidene fluoride of fluidity 10 is used for preparing the composition according to the instant invention.

The adhesion of the complete coating, the primary coat according to the instant invention and the finishing lacquer, is shown to be good when the square test is applied.

EXAMPLE 11

The steps of Example 1 are repeated except that now 20% of polytetrafluoroethylene and 5% of polyvinylidene fluoride are used in the composition according to the instant invention. The polyvinylidene fluoride thus represents 20% of the mixture of polytetrafluoroethylene and polyvinylidene fluoride.

The adhesion of the complete coating, the primary coat according to the instant invention and finishing lacquer, is shown to be good when the square test is applied.

EXAMPLE 12

The steps of Example 1 are repeated and in addition there is introduced into the composition according to the instant invention 4% of titanium dioxide and 1% of iron oxide as pigments, these additions being compensated for by an equivalent reduction in the quantity of water used.

The adhesion of the complete coating, the primary coat according to the instant invention and the finishing lacquer, is shown to be good when the square test is applied.

EXAMPLE 13

The steps of Example 1 are repeated except that now a dispersion of polytetrafluoroethylene SOREFLON 60, type III is used, instead of SOREFLON 604, for both the preparation of the composition according to the instant invention and the finishing lacquer. The adhesion of the complete coating is shown to be good when the square test is applied.

EXAMPLE 14

The steps of Example 1 are repeated except that now a sheet of aluminum covered with a ceramic frit is used as support.

The adhesion of the complete coating, the primary coat according to the instant invention and the finishing lacquer, is shown to be good when the square test applied.

EXAMPLE 15

The steps of Example 1 are repeated except that now a sheet of steel which has been simply degreased is used as support.

The adhesion of the complete coating, the primary coat according to the instant invention and the finishing lacquer, is shown to be good when the square test applied.

We claim:
1. A coating composition comprising:
  a. polytetrafluoroethylene in the dispersed form;
  b. polyvinylidene fluoride in the dispersed form;
  c. lithia; and
  d. an aqueous medium.
2. The composition of claim 1 wherein the polytetrafluoroethylene and the polyvinylidene fluoride together represent from about 10 to 50% by weight of the total composition.
3. The composition of claim 2 wherein the polyvinylidene fluoride represents from about 5 to 25% by weight of the total of polytetrafluoroethylene and polyvinylidene fluoride.
4. The composition of claim 1 wherein the lithia represents from about 0.2 to 2% by weight of the total of polytetrafluoroethylene and polyvinylidene fluoride.
5. Articles of manufacture having adhered thereto and dried thereon a coating composition comprising:
  a. polytetrafluoroethylene in the dispersed form;
  b. polyvinylidene fluoride in the dispersed form; and
  c. lithia.

* * * * *

UNITED STATES PATENT AND TRADEMARK OFFICE
CERTIFICATE OF CORRECTION

PATENT NO. : 4,039,497
DATED : August 2, 1977
INVENTOR(S) : Maurice Troussier and Huynh Van Lang It is certified that error appears in the above-identified patent and that said Letters Patent are hereby corrected as shown below:

Column 7, Line 6, reads "01625%", should read --0.625%--

Signed and Sealed this

Twenty-first Day of March 1978

[SEAL]

Attest:

RUTH C. MASON
Attesting Officer

LUTRELLE F. PARKER
Acting Commissioner of Patents and Trademarks